United States Patent [19]

Harada

[11] Patent Number: 4,633,355
[45] Date of Patent: Dec. 30, 1986

[54] VIDEO TAPE CASSETTE WITH EASY ASSEMBLY OF ITS LID AND REEL BRAKES

[75] Inventor: Masayuki Harada, Miyagi, Japan

[73] Assignee: Sony Corporation, Tokyo, Japan

[21] Appl. No.: 651,452

[22] Filed: Sep. 17, 1984

[51] Int. Cl.$^4$ ............................................. G11B 23/08
[52] U.S. Cl. ..................................... 360/132; 242/198
[58] Field of Search ................. 360/132; 242/199, 198

[56] References Cited

U.S. PATENT DOCUMENTS 4,553,717 11/1985 Takagi .................................. 360/132
4,556,153 12/1985 Takagi et al. ........................ 242/199

FOREIGN PATENT DOCUMENTS 0090573 10/1983 European Pat. Off. .
010968 5/1984 European Pat. Off. .
0111876 6/1984 European Pat. Off. .

*Primary Examiner*—Robert S. Tupper
*Attorney, Agent, or Firm*—Lewis H. Eslinger; Alvin Sinderbrand

[57] ABSTRACT

In a video tape cassette having upper and lower housing portions which are assembled together in a direction normal to a plane of separation therebetween to define a substantially rectangular housing with an opening extending along a side thereof between end walls of the housing for containing reels having tape wound thereon and guided between the reels in a run extending across the opening, and a lid structure which is pivotally mounted on the housing for movement by a coil spring from an open position exposing the tape run to a closed position in which the lid structure covers the tape run; the assembling of the tape cassette is facilitated by providing anchors on the lid structure by which the coil spring is initially or tentatively located during the mounting of the lid structure on one of the housing portions, whereupon the coil spring is transferred into engagement with an anchor on that one housing portion in preparation for assembling of the latter with the other housing portion. The tape cassette is further provided with a reel braking structure which is also easily installed in the direction normal to the plane of separation of the upper and lower housing portions, and which is releasable from the outside of the housing to permit free rotation of the reels.

9 Claims, 13 Drawing Figures

VIDEO TAPE CASSETTE WITH EASY ASSEMBLY OF ITS LID AND REEL BRAKES

BACKGROUND OF THE INVENTION

1. Field of the Invention

This invention relates generally to tape cassettes, and more particularly is directed to improvements in tape cassettes for use in recording and/or reproducing apparatus, such as, video tape recorders and the like.

2. Description of the Prior Art

A tape cassette for use in a conventional video tape recorder (hereinafter referred to as a VTR) is provided with an opening extending along one side of the cassette housing and with a cutout in the bottom of the housing communicating with such opening. The magnetic tape wound on reels rotatable within the cassette housing is guided in a run extending across the opening and, when the tape cassette is loaded in a cassette holder of the VTR, tape loading pins mounted on a loading ring are inserted into the cutout of the cassette housing in back of such tape run. Upon rotation of the loading ring, the tape loading pins engage the tape in the run between the reels, withdraw the tape from the cassette housing and wrap the withdrawn tape around the peripheral surface of a guide drum of the VTR. The conventional tape cassette is usually provided with a lid which is movable on the cassette housing between a closed position covering the opening of the housing and an open position to which the lid is moved when the cassette is placed in the cassette holder and in which the tape run extending across the housing opening is fully exposed.

Although the lid of the foregoing conventional tape cassette, when in its closed position, is intended to prevent accidental damage to the run of the tape extending across the opening of the cassette housing, such lid, even when in its closed position, only covers the outer surface of the tape run. Therefore, dust or the like may adhere to the back surface of the tape run which is exposed through the cutout in the bottom of the cassette housing even when the lid is in its closed position. As a result, dropouts may occur in the recording and reproducing of signals on the tape.

In order to provide increased protection for the tape in a cassette of the described type, it has been proposed, for example, in U.S. Pat. No. 4,418,373, issued Nov. 29, 1983, and having a common assignee herewith, to provide the cassette housing with a lid structure which, when in a closed position, that is, when the cassette is not in use, completely encloses the tape run extending between the reels across an opening of the cassette housing. Such lid structure is urged to its closed position by a coil spring associated therewith, and which gives rise to difficulties in assembling the tape cassette.

OBJECTS AND SUMMARY OF THE INVENTION

Accordingly, it is an object of this invention to provide an improved tape cassette of the decribed character which facilitates the assembly thereof.

More specifically, it is an object of the invention to provide a tape cassette, as aforesaid, having a coil spring by which a lid structure of the cassette housing is urged to its closed position, and in which an arrangement is provided for facilitating the positioning of such coil spring during the assembling of the various parts of the cassette.

Another object is to provide a tape cassette, as aforesaid, with a brake assembly operative, when the cassette is not in use, to prevent, turning of the reels in the directions creating slack in the tape run extending across the housing opening, and in which such brake assembly is arranged to facilitate its installation in the cassette housing, and even to permit automated procedures therefor.

In accordance with an aspect of the invention, a tape cassette comprises upper and lower housing portions assembled together to define a housing of substantially rectangular configuration having end walls and an opening along a side of the housing between such end walls, reels rotatably contained in the housing and having tape wound thereon, guide means in the housing leading the tape between the reels in a run extending across the opening, lid means having ears at its opposite ends pivotally engageable with the end walls to define a pivot axis of the lid means about which the latter is movable between open and closed positions, coil spring means including a coil portion and angularly displaced leg portions extending from the coil portion, first and second spring anchor means located on one of the ears and being tentatively or initially engageable with the leg portions of the coil spring means for initial positioning of the latter relative to the lid means, and third spring anchor means on one of the housing portions adjacent one of the end walls and to which one of the leg portions of the coil spring means is transferred when assembling the lid means in respect to said one portion of the housing, whereupon the coil spring means urges the lid means to one of its open and closed positions relative to the housing.

In a preferred embodiment of the invention, a latch element is pivoted on an end wall of the housing and holds or latches a keeper element on the lid means when the latch element is in an engaged condition with the lid means in its closed position, and such keeper element also functions as one of the first and second spring anchor means. Furthermore, in the assembled condition of the cassette housing, a leg portion of the coil spring means provided for urging the lid means to its closed position also acts on the latch element for urging the latter to its engaged condition.

In accordance with another aspect of this invention, the reels are rotatable located in side-by-side relation within the cassette housing and have flanges with toothed peripheries, a braking member is installed in the housing in a direction normal to the plane of separation between the upper and lower housing portions and is movable parallel to that plane between engaged and disengaged positions, with one of the housing portions having an opening through which the braking member is accessible from the exterior for movement to its disengaged position, and a plate spring member is also installed in the housing in the direction normal to the plane of separation and, when thus installed, is effective to urge the braking member to its engaged position for preventing rotation of the reels in the directions for creating slack in the tape run between the reels.

In a preferred embodiment of the invention, the braking member includes a body insertable in the direction normal to the plane of separation between the housing portions into a guide structure integral with the lower housing portion at a location between the reels, and a pair of divering, blade-like extensions projecting from the brake body toward the reels and being engageable with the toothed peripheries of the respective flanges in the engaged position of the braking member, and the brake body has an end surface with a sloping portion engageable by the plate spring member to permit installation of the latter, in said direction normal to the plane of separation, into a spring positioning structure which is also formed in the lower housing portion.

The above, and other objects, features and advantages of this invention, will be apparent in the following detailed description of an illustrative embodiment of the invention which is to be read in connection with the accompanying drawings forming a part hereof and wherein the same reference numerals identify corresponding parts in the several views.

DETAILED DESCRIPTION OF A PREFERRED EMBODIMENT

Figure 1:
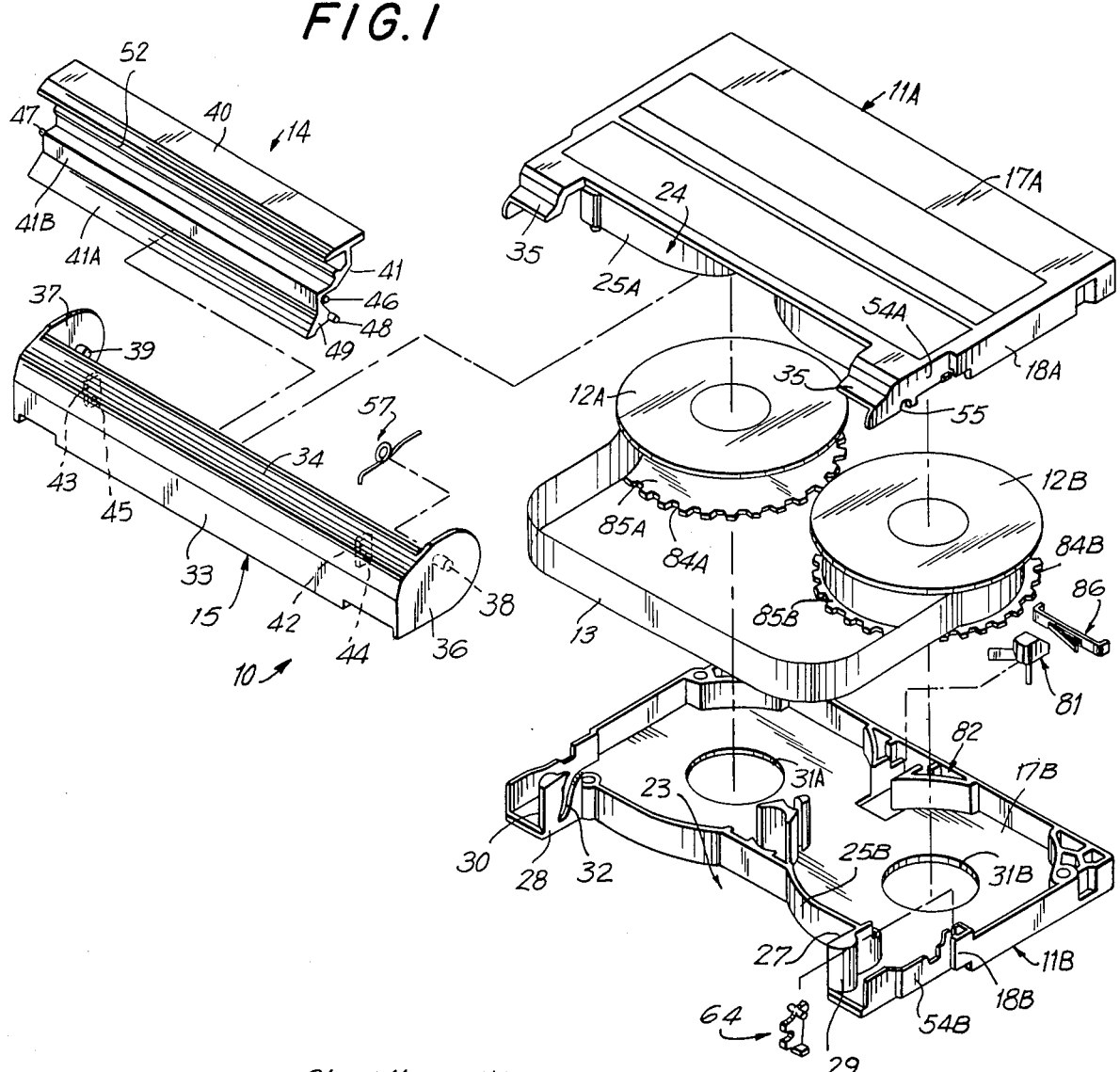
FIG. 1 is an exploded perspective view showing the various major components of a video tape cassette in accordance with an embodiment of this invention.
Figure 2:
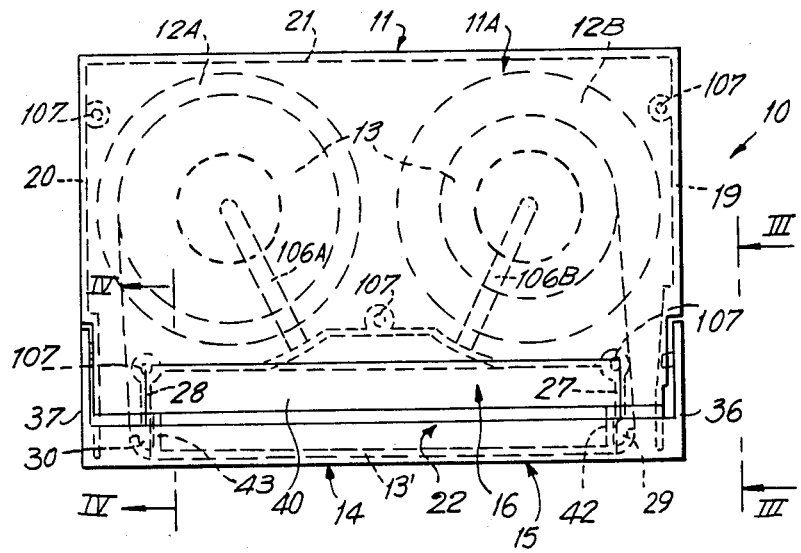
FIG. 2 is a top plan view of a video cassette assembled from the components shown in FIG. 1.

Referring to the drawings in detail, and initially to FIGS. 1 and 2 thereof, it will be seen that the invention is there shown applied to a tape cassette 10 of a type intended for use in a video tape recorder (VTR). The cassette 10 generally comprises a substantially rectangular cassette housing 11 composed of upper and lower housing portions 11A and 11B, a pair of reels 12A and 12B rotatably contained in housing 11 in side-by-side relation and having magnetic tape 13 wound on the reels, and a lid assembly 14 composed of an outer lid member 15 and an inner lid member 16 and being pivotally mounted on housing 11 for movement between open and closed positions. In the open position of the lid assembly indicated in dot-dash at 14' on FIG. 4, a run 13' of the tape between reels 12A and 12B is exposed for withdrawal from housing 11, and, in the closed position shown in full lines on FIG. 4, lid assembly 14 covers or encloses tape run 13' both at the back and front of the latter.

The upper and lower housing portions 11A and 11B are shown to have substantially rectangular top and bottom walls 17A and 17B, respectively, and flanges 18A and 18B extend along the margins of top and bottom walls 17A and 17B, respectively, and engage each other at a plane of separation, substantially parallel with walls 17A and 17B when housing portions 11A and 11B are brought together vertically, that is, in a direction normal to the plane of separation for defining a peripheral structure of the housing which includes end walls 19 and 20 at the opposite relatively short ends of housing 11 and a back or side wall 21 along one of the relatively long sides of the rectangular housing (FIG. 2). At the front or other long side of housing 11, there is an opening 22 extending substantially frome one to the other of end walls 19 and 20, and bottom wall 17B has an approximately trapezoidal cutout 23 communicating with opening 22 at the front of the housing. The width of cutout 23 is smaller than that of opening 22, that is, the ends of cutout 23 are spaced inwardly from end walls 19 and 20. A substantially rectangular cutout 24 which is approximately as wide as cutout 23 is formed in the forward portion of top wall 17A and has a depth smaller than the depth of cutout 23 measured at the middle of housing 11. A flange 25A with curving portions depends from top wall 17A in back of cutout 24 and mates with a flange 25B having similarly curving portions directed upwardly from bottom wall 17B along the back edge of cutout 23. When housing portions 11A and 11B are brought vertically together, flanges 25A and 25B mate to define a partition 25 (FIG. 4) by which a space 26 containing reels 12A and 12B within housing 11 is isolated from opening 22 and cutout 23.

At the opposite ends of cutout 23, housing portion 11B is formed or molded with upstanding walls 27 and 28 (FIG. 1) directed forwardly from the opposite ends of flange 25B and being higher than the latter so as to extend from bottom wall 17B to top wall 17A in the assembled cassette. The outwardly directed surfaces of walls 27 and 28 which are spaced from end walls 19 and 20 are formed with rounded or semi-cylindrical surface portions 29 and 30 acting as tape guides at the opposite ends of opening 22. Bottom wall 17B has laterally spaced apart circular apertures 31A and 31B in which hubs of reels 12A and 12B, respectively, are loosely received for rotatably locating the reels in space 26, and through which drive shafts or spindles (not shown) of a VTR can conventionally engage hubs of reels 12A and 12B when cassette 10 is operatively positioned in the VTR.

The tape extending between reels 12A and 12B is directed forwardly from the reels and about guides 29 and 30 so as to establish the tape run 13' extending across opening 22. Walls 27 and 28 are further shown to have curving guide grooves 32 extending approximately vertically in their inwardly directed surfaces and being operative, as hereinafter described in detail, for controlling pivoting movements of inner lid member 16 relative to outer lid member 15 during the movements of the latter between the open and closed positions of lid assembly 14.

Outer lid member 15 is shown to have a front wall portion 33 which is laterally elongated to have a length substantially equal to the distance between end walls 19 and 20 of housing 11, a shallow top wall portion 34 extending from the upper edge of front wall portion 33 and having a width smaller than the depth of cutout 24 in top wall 17A so as to be engageable over depressed, shelf-like extensions 35 of top wall 17A at the opposite ends of cutout 24, and ears 36 and 37 directed rearwardly from the opposite ends of front and top wall portions 33 and 34 and having inwardly directed pivot pins or trunnions 38 and 39, respectively, for pivotally mounting outer lid member 15 on end walls 19 and 20, as hereinafter described in detail. When thus pivotally connected with housing 11, outer lid member 15, in its closed position shown in full lines on FIGS. 3 and 4, has wall portion 33 covering the front surface of tape run 13', while top wall portion 34 of lid member 15 extends over the tape run. However, in such closed position of outer lid member 15, the back edge of top wall portion 34 thereof is spaced substantially from the longitudinal edge of top wall 17A along cutout 24 so as to leave a gap therebetween which is to be filled or closed by inner lid member 16.

Inner lid member 16 has a length substantially equal to that of cutout 24 and includes an elongated head portion 40 dimensioned to span the gap between the longitudinal edge of cutout 24 and the top wall portion 34 of outer lid member 15 in the closed position of the latter, and an angled skirt portion 41 extending generally downwardly and forwardly from head portion 40 along the length of the latter. As shown particularly on FIG. 4, skirt portion 41 of inner lid member 16 is dimensioned so that, when lid assembly 14 is in its closed position shown in full lines with head portion 40 spanning and closing the gap between the longitudinal edge of cutout 24 and top wall portion 34 of outer lid member 15, skirt portion 41 extends downwardly in back of tape run 13' with the lower edge part 41A of skirt portion 41 substantially abutting the lower edge portion of front wall portion 33 under tape run 13'. Thus, tape run 13' is substantially enclosed and protected within a space defined between lid members 15 and 16 in the closed position of assembly 14 and there is no possibility of dust accummulating on, or other injurious contact with the back surface of tape run 13' through cutout 23. Mounting lugs 42 and 43 are desirably molded integrally with top wall portion 34 of outer lid member 15 at laterally spaced locations corresponding to the ends of inner lid member 16, and are formed with holes 44 and 45 for pivotally receiving aligned pins 46 and 47 (FIG. 1) extending from opposite ends of an intermediate part 41B of skirt portion 41. Lug members 42 and 43 are desirably laterally resilient, while the end surfaces of pivot pins 46 and 47 are oblique or slanted to permit such pivot pins to be snapped into the respective holes 44 and 45 of the mounting lugs. Upon engagement of pins 46 and 47 in the holes of lugs 42 and 43, inner lid member 16 is mounted on outer lid member 15 for pivotal movement in respect to the latter between the previously described closed position of lid assembly 14, in which the lower edge part 41A of skirt portion 41 substantially engages against the lower edge of front wall portion 33 for enclosing and protecting tape run 13' between lid members 15 and 16, and the position shown in dot-dash lines on FIG. 4 which corresponds to the open position 14' of the lid assembly and which has the various parts of the latter identified by the previously mentioned reference numerals but with primes affixed thereto. It will be seen that, in such open position of lid assembly 14', head portion 40' of inner lid member 16' overlies top portion 34' of the outer lid member, while skirt portion 41' of the inner lid member extends substantially parallel to front wall portion 33' of outer lid member 15'. Thus, in the open position of lid assembly 14', the end edge part 41A' of skirt portion 41' is spaced substantially away from the free edge part of front wall portion 33' so as to avoid any interference with the entry or withdrawal of tape run 13' in the space between front wall portion 33 and skirt portion 41 as lid assembly 14 is moved to and from its closed position.

Such movements of inner lid member 16 relative to outer lid member 15 are effected in response to pivotal movements of outer lid member 15 relative to housing 11 by means of follower pins 48 which are directed outwardly from arms 49 at the opposite ends of the free edge part 41A of skirt portion 41 and which are slidably engageable in the cam or guide grooves 32 in end walls 27 and 28. The illustrated shape of each of the cam or guide grooves 32 is selected to ensure that lower edge part 41A of skirt portion 41 comes close to the lower edge of front wall portion 33 only when lid assembly 14 is approximately at its fully closed position for avoiding any contact of the lid assembly with tape run 13' during movements between the open and closed positions of the lid assembly even if there is some slack in tape run 13'. Furthermore, cam or guide grooves 32 are shaped to ensure that, in the open position of the lid assembly indicated at 14' on FIG. 4, wall portions 33' and 34' of outer lid member 15' and the entire inner lid member 16' are disposed above the plane of top wall 17A. Thus, in the open position of the lid assembly indicated at 14' on FIG. 4, the space 50 between tape run 13' and partition 25 is completely open or free or any of portions of the lid assembly that might otherwise interefere with, or limit the upward insertion of tape loading pins through cutout 23.

Figure 4:
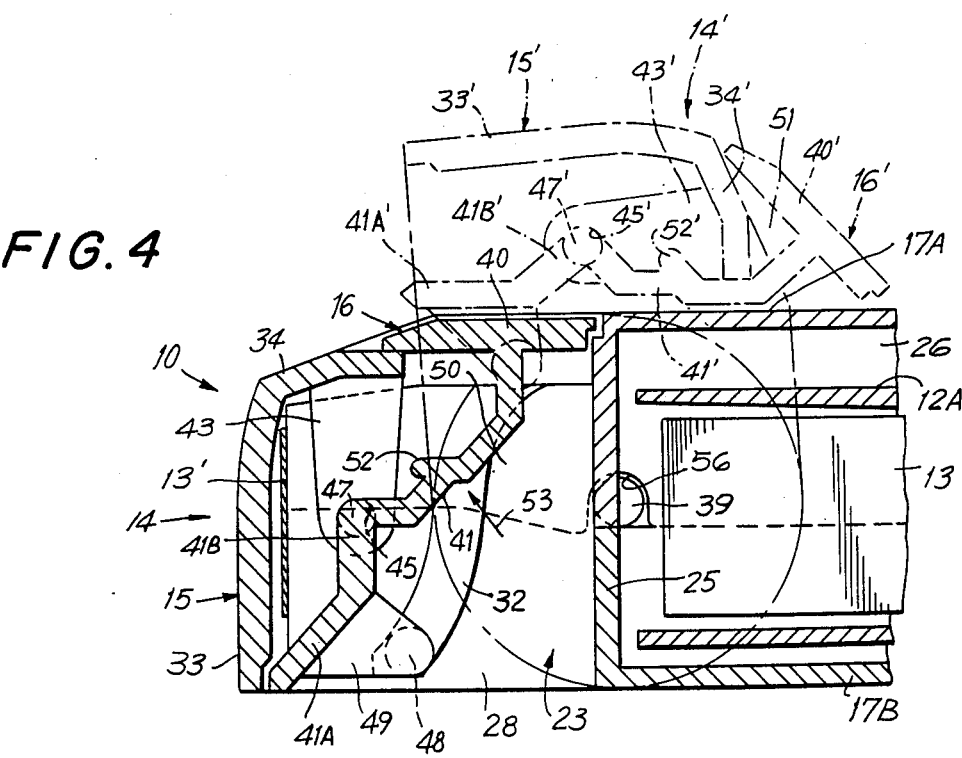
FIG. 4 is an enlarged fragmentary sectional view taken along the line IV—IV on FIG. 2.

The intermediate part 41B of skirt portion 41 is desirably angled or bent toward the axis defined by pivot pins 47 and 48, as shown, so that a forwardly opening recess 51 is defined between head portion 40 and the upper part of skirt portion 41 for the reception of top wall portion 34 of outer lid member 15 when the lid assembly is in its open position indicated at 14' on FIG. 4. Moreover, with the top wall portion in recess 51, as indicated at 34' on FIG. 4, head portion 40' of inner lid member 16' forms a smooth inclined extension from front wall portion 33' of outer lid member 15.

Furthermore, between angled part 41B and head portion 40, skirt portion 41 of inner lid member 16 is preferably formed with a rib 52 which, along with angled part 41B imparts substantial rigidity to skirt portion 41 even though the latter may be desirably molded with relatively thin wall sections. By reason of such substantial rigidity, if a user of cassette 10 extends a finger through cutout 23 and presses against skirt portion 41 in the direction of the arrow 53 on FIG. 4, such pressure will not readily bend or flex the skirt portion in a manner to withdraw pivot pins 46 and 47 from holes 44 and 45 in mounting lugs 42 and 43.

Figure 5:
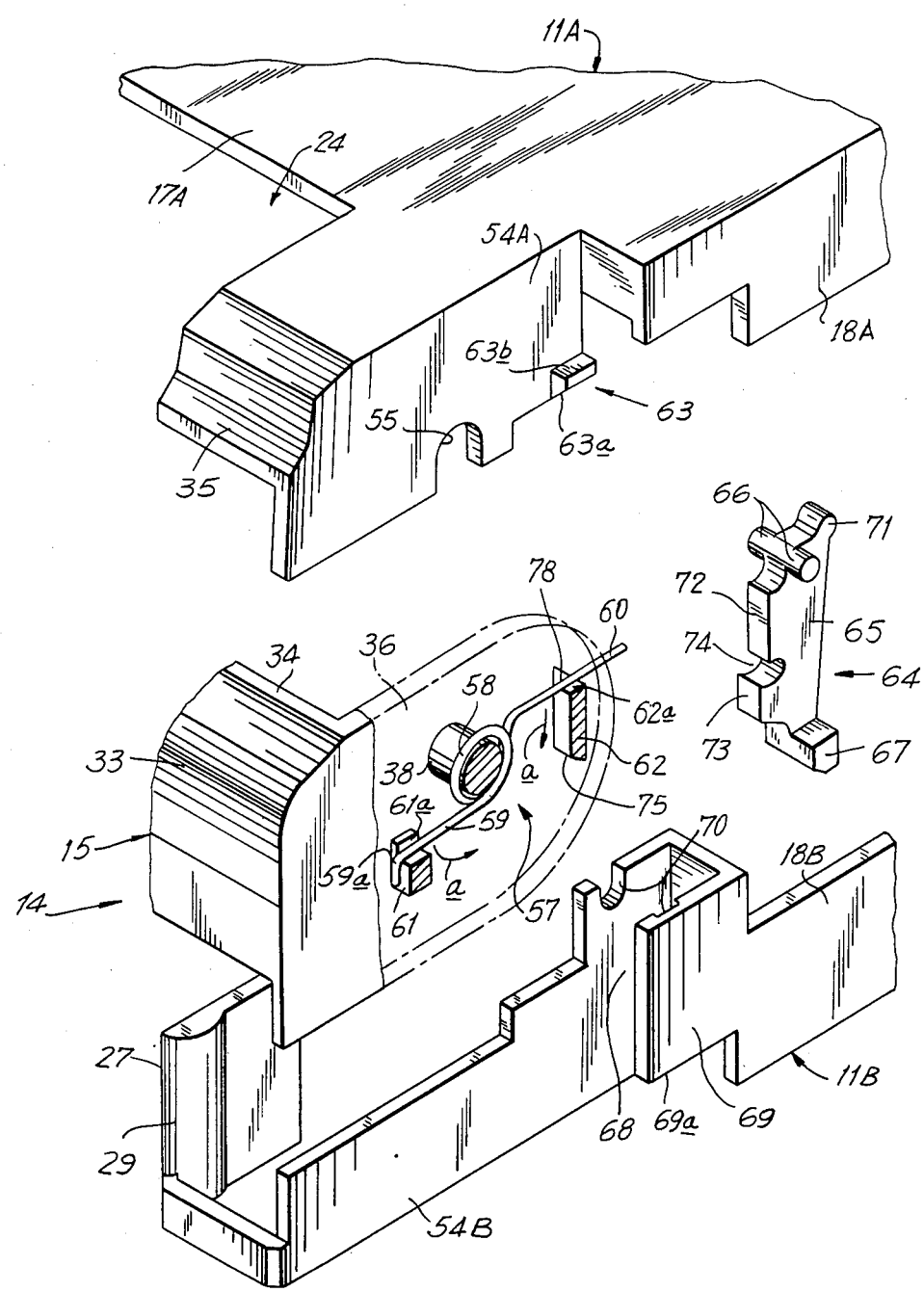
FIG. 5 is an enlarged fragmentary exploded perspective view of portions of the housing and lid structure and of a latch element included in the tape cassette of FIG. 2, and illustrating a first stage in the assembling of such cassette.

As shown particularly on FIG. 5, portions 54A and 54B of flanges 18A and 18B which define the forward parts of end walls 19 and 20 are inwardly offset or recessed to accommodate ears 36 and 37 of outer lid member 15. Such recessed flange parts 54A at the opposite ends of upper housing portion 11A are formed with downwardly opening cutouts 55 and 56 (FIGS. 3-5) which are shaped to receive and act as pivot seats for pivot pins or trunnions 38 and 39, respectively, formed on ears 36 and 37. It will be apparent that, when housing portions 11A and 11B are vertically assembled together, seats 55 and 56 in recessed flange parts 54A are closed, at the bottom, by the upper edges of the corresponding recessed flange parts 54B of lower housing portion 11B, thereby to prevent removal of the pivotally mounted outer lid member 15 from assembled housing 11.

Figure 3:
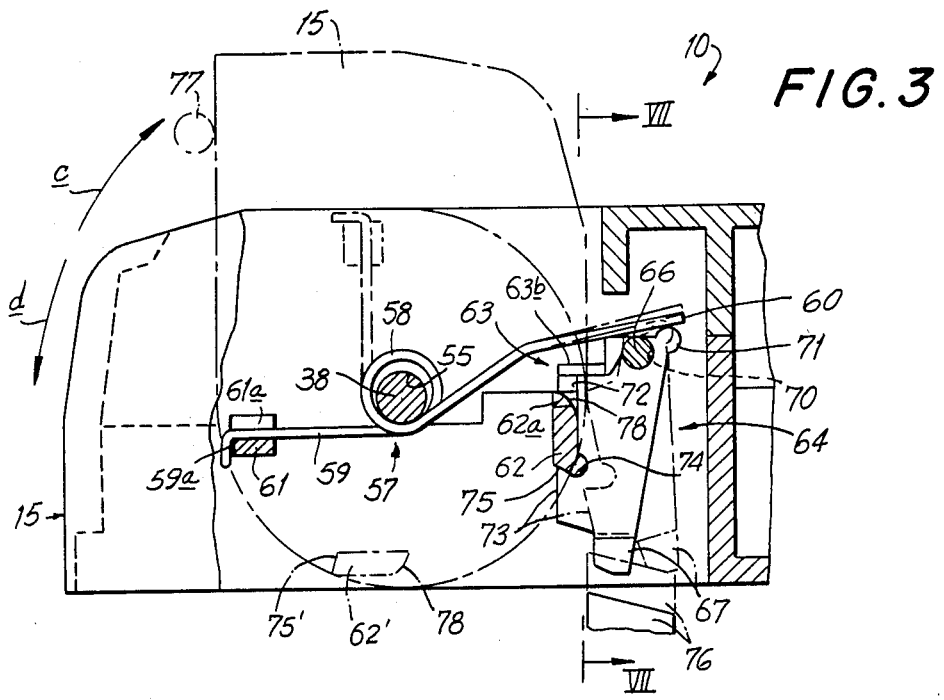
FIG. 3 is an enlarged fragmentary end elevational view of the video tape cassette of FIG. 2 as viewed in the direction of the arrows III—III thereon, and which is shown with an end wall portion of the cassette housing being broken away and in section for more clearly illustrating a feature of this invention.
Figure 6:
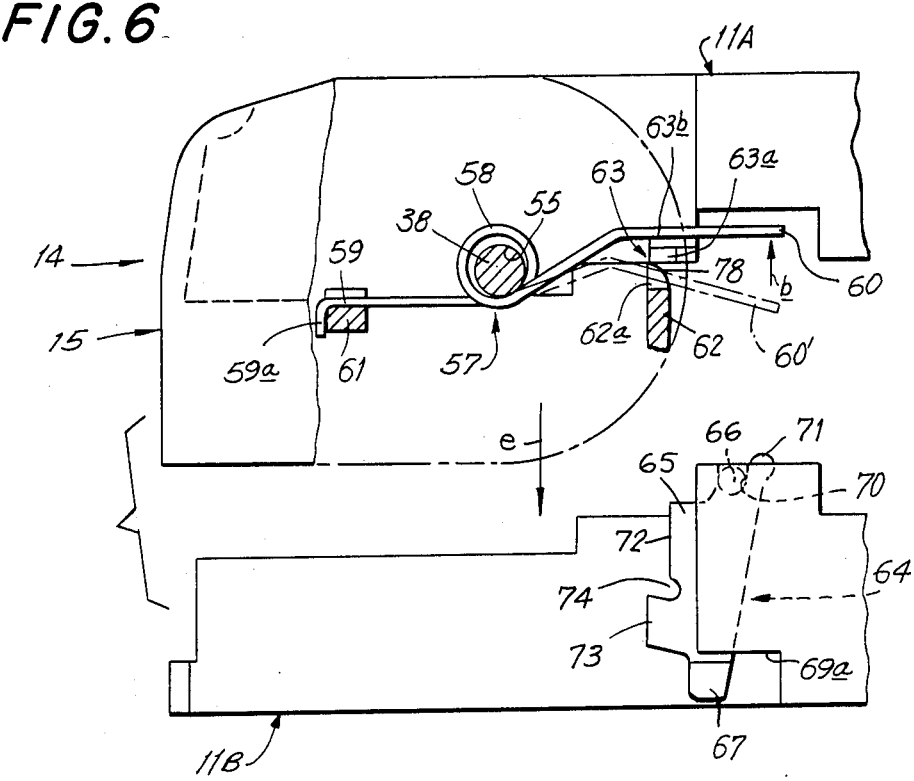
FIG. 6 is a fragmentary end elevational view similar to that of FIG. 3, but illustrating a stage in the assembling of the cassette which is intermediate the initial stage of FIG. 5 and the final or completed stage of FIG. 3.

In order to urge lid assembly 14 to its closed position, tape cassette 10 is further shown to include a coil spring 57 which is particularly shown on FIGS. 3, 5 and 6 to include a coil portion 58 and angularly displaced leg portions 59 and 60 extending normally in substantially opposed directions from coil portion 58 which resiliently resists angular displacement of such leg portions relative to each other. Although only a single coil spring 57 is associated with pivot pin 38, as hereinafter described in detail, it will be appreciated that a similar coil spring could also be associated with the other pivot pin 39. More particularly, coil portion 58 of coil spring 57 is disposed on pivot pin 38 extending from the inner surface of ear 36, and leg portion 59, which desirably has a downwardly bent end 59a, is engaged with a spring anchor 61 which extends inwardly from ear 36 between pivot pin 38 and front wall portion 33 of lid member 15. Spring anchor 61 desirably has a notch or recess 61a in its upper surface adjacent the inner surface of ear 36 so that leg portion 59 can be engaged in such notch or recess 61a for resisting inward removal of coil portion 58 from pivot pin 38.

In accordance with this invention, the other leg portion 60 of coil spring 57 is initially or tentatively engaged with a second spring anchor 62 extending inwardly from ear 36 in back of pivot pin 38, that is, at a location approximately diammetrically opposed from that of the first spring anchor 61. The spring anchor 62 also desirably has a notch or recess 62a in its upper end surface adjacent ear 36 for receiving leg portion 60 when initially engaged by the latter, and thereby further preventing inadvertent separation of coil spring 57 from ear 36 during the assembling of lid assembly 14 in respect to housing 11. Of course, spring 57 is shaped so that, when coil portion 58 is disposed on pivot pin 38 and leg portions 59 and 60 bear against anchors 61 and 62, such leg portions 59 and 60 are resiliently urged by coil portion 58 in the directions of the arrows a on FIG. 5, that is, in the directions for retaining leg portions 59 and 60 in notches 61a and 62a. Further, at least the notch 62a in anchor 62 has a lateral dimension substantially larger than the diameter of the spring wire forming coil spring 57 so that leg portion 60 is free to move laterally within notch 62a.

In assembling tape cassette 10 according to this invention, lid assembly 14 is first associated with upper housing portion 11A by inserting pivot pins 38 and 39 vertically upward in recesses or seats 55 and 56, respectively. Then, leg portion 60 of coil spring 57 is manually displaced upwardly in the direction of the arrow b on FIG. 6 so as to be moved out of notch 62a and into engagement with a third spring anchor 63 formed on the inwardly offset or recessed flange part 54A which eventually forms part of end wall 19. More particularly, and as shown on FIG. 5, spring anchor 63 has an oblique or inclined under surface portion 63a and a horizontal top surface 63b so that, during the manual movement of leg portion 60 of the spring in the direction of the arrow b on FIG. 6 from the position indicated in dot-dash lines at 60' to the position indicated in full lines, leg portion 60 is deflected laterally by oblique surface portion 63a and then snaps back to engage on top of surface 63b. When leg portion 60 is thus engaged with anchor 63, the effect of coil spring 57 is to securely hold pivot pins 38 and 39 in seats or notches 55 and 56, respectively, and further to hold outer lid member 15 in its closed position with its top wall portion 34 bearing downwardly on shelf-like forward extensions 35 of upper housing portion 11A.

The tape cassette 10 is further shown to include a latch element 64 mounted adjacent end wall 19 of housing 11 and having an engaged condition shown in full lines on FIG. 3 for locking lid assembly 14 in its closed position and a released or disengaged condition shown in dot-dash lines on FIG. 3 for permitting movement of the lid assembly to its open position. Further, in accordance with this invention, the coil spring 57 provided for urging lid assembly 14 to its closed position also acts on latch element 64, when housing portions 11A and 11B are assembled together, for urging latch element 64 to the engaged condition thereof. More particularly, as shown on FIG. 5, latch element 64, which may be suitably molded of a synthetic resin, includes an elongated body 65 with trunnions or pivot pins 66 projecting from the opposite sides of its upper end and an actuating lug 67 projecting laterally outward from the lower end of body 65. Latch element 64 is received in a forwardly opening space 68 defined between offset flange part 54B of end wall 19 and an adjacent extension 69 of flange 18B, with trunnions 66 being turnable in substantially semi-circular, upwardly opening seats 70 formed in the upper edges of flange part 54B and flange extension 69. Thus, latch element 64 pivotally depends in space 68 with lug 67 projecting outwardly through a cutout 69a at the bottom of flange extension 69. The upper end of body 65 further has a rounded abutment or node 71 projecting upwardly therefrom above pivot pins or trunnions 66 and being spaced rearwardly from the latter. In the assembled cassette embodying this invention (FIG. 3), abutment or node 71 of latch element 64 extends substantially above the normal or horizontal surface 63b of spring anchor 63 so that leg portion 60 of coil spring 57 extenging back of anchor 63 is engaged with node 71 and lifted from surface 63b of anchor 63 so as to urge latch element 64 to pivot in the clockwise direction, as viewed on FIG. 3, about the axis defined by the engagement of trunnions 66 in seats 70.

Preferably, in the tape cassette 10 according to this invention, spring anchor 62 which tentatively or initially engages leg portion 60 of coil spring 57 during the mounting of lid assembly 14 on upper housing portion 11A, as described above, also functions as a keeper engageable by latch element 64 in the engaged condition of the latter for holding lid assembly 14 in its closed position. More specifically, in the closed position of lid assembly 14, an upper front surface portion 72 of body 65 is engageable against anchor or keeper element 62, as shown in full lines on FIG. 3, for limiting the pivoting of latch element 64 in the clockwise direction under the urging of leg portion 60 of spring 57. In such limited position of latch element 64, a latch nose 73 defined by a forwardly protruding lower portion of body 65 separated from surface 72 by an undercut 74 is engageable by a lower end edge 75 of anchor 62 as shown in full lines on FIG. 3, for locking lid assembly 14 in its closed position.

When tape cassette 10 according to this invention is operatively positioned in a VTR corresponding thereto, a latch release member 76 having an oblique upper end edge is suitably displaced upwardly to the position shown in dot-dash lines on FIG. 3, or otherwise acts upon lug 67 for angularly displacing latch element 64 to its released condition shown in dot-dash lines, and in which nose 73 is retracted or withdrawn from surface 75 and out of the path of travel of anchor 62. Thus, outer lid member 15 is released or freed for angular movement in the direction of the arrow c on FIG. 3 from its closed position shown in full lines to its open position indicated at 15'. For example, such movement of lid member 15 may be effected by a suitably operated lid opener 77 which is engageable from below with lid member 15 and is moved in the direction of the arrow c after release or disengagement of latch element 64 from spring anchor or keeper 62. By reason of the engagement of follower pins 48 in cam grooves 32, in the course of the pivotal movement of outer lid member 15 from its closed position to its open position, inner lid member 16 is pivoted relative to outer lid member 15 and is transported with the latter from the position shown in full lines to the position shown in dot-dash lines on FIG. 4.

It will be appreciated that the displacement of lid assembly 14 from its closed position to its open position is effected against the yieldable resistance of spring 57. Therefore, upon the removal of lid opener 77 from engagement with outer lid member 15, coil spring 57 is effective to angularly urge outer lid member 15 in the direction of the arrow d on FIG. 3 for return to the closed position of the lid assembly. In the course of the pivotal or angular movement of outer lid member 15 in the direction of the arrow d, a curved upper end surface 78 on anchor or keeper 62 engages nose 73 of latch element 64 so as to smoothly displace the nose 73 out of the path of travel of keeper 62 until lid member 15 has returned to its closed position and nose 73 can again engage against end edge surface 75 for locking the lid assembly in its closed position.

In assembling the tape cassette 10 according to this invention, after lid assembly 14 has been associated with upper housing portion 11A, as previously described, latch element 64 is simply placed in spaced 68 with its trunnions 66 engaging in seats 70 of lower housing portion 11B, as shown on FIG. 6, and then the upper housing portion 11A and the lower housing portion 11B are brought vertically together, as indicated by the arrow e. When housing portions 11A and 11B are thus brought together in the direction normal to the plane of separation therebetween, leg portion 60 of spring 57 is automatically engaged with node 71 on latch element 64 so as to raise leg portion 60 of the spring from anchor 63 and further to ensure that latch element 64 is urged to its engaged condition. It will be appreciated that, in the tape cassette embodying this invention, coil spring 57 is securely associated with lid assembly 14 during the mounting of the latter on upper housing portion 11A, and that the coil spring 57, after transfer of its leg portion 60 from engagement with anchor 62 into engagement with anchor 63, is automatically positioned for engagement with node 72 on latch element 64 in response to bringing together of housing portions 11A and 11B in the vertical direction of arrow e. Thus, spring 57 which is intended to perform the dual functions of urging lid assembly 14 to its closed position and of urging latch element 64 to its engaged condition, presents no impediment to the easy, and even automatic assembling of the housing portions.

The tape cassette 10 further includes a brake assembly 80 for preventing turning of reels 12A and 12B in the directions f and g (FIG. 9) producing slack in the tape run 13' when cassette 10 is not in use. In accordance with this invention, such brake assembly 80 is capable of being installed in housing 11 in the vertical direction, that is, in the direction e (FIG. 13) normal to the plane of separation between housing portions 11A and 11D, whereby to further facilitate assembling of cassette 10.

In accordance with an embodiment of the invention shown on FIGS. 8-13, brake assembly 80 generally includes a brake body 81, a brake guide structure 82 in housing 11 at a location between reels 12A and 12B adjacent the side of the housing remote from opening 22 and being operative to guide brake body 81 in the fore and aft direction, that is, in a direction parallel to the plane of separation of housing portions 11A and 11B, between engaged and disengaged positions, a pair of diverging, resilient blade-like extensions 83A and 83B projecting from brake body 81 toward reels 12A and 12B, respectively, and being engageable with toothed peripheries 84A and 84B provided on lower flanges 85A and 85B of reels 12A and 12B, respectively, and a plate spring member 86 which is also installed in housing 11 in the direction normal to the plane of separation of housing portions 11A and 11B for urging brake body 81 to its engaged position.

Figure 9:
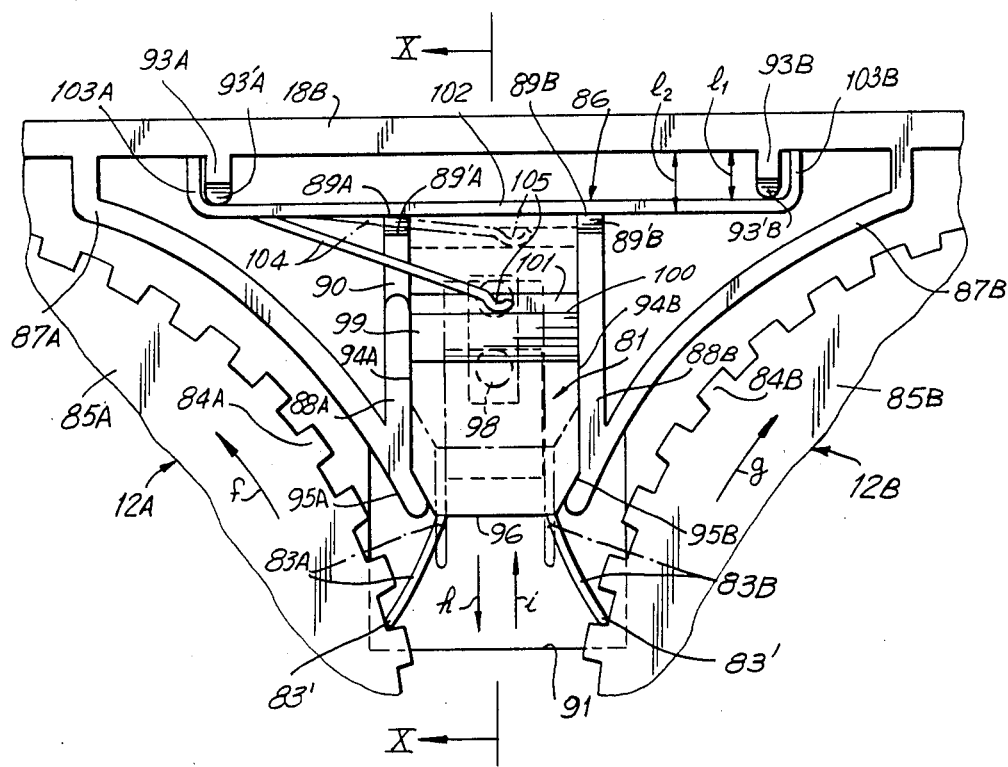
FIG. 9 is an enlarged fragmentary view corresponding to a portion of FIG. 8 for better illustrating the braking assembly.
Figure 11:
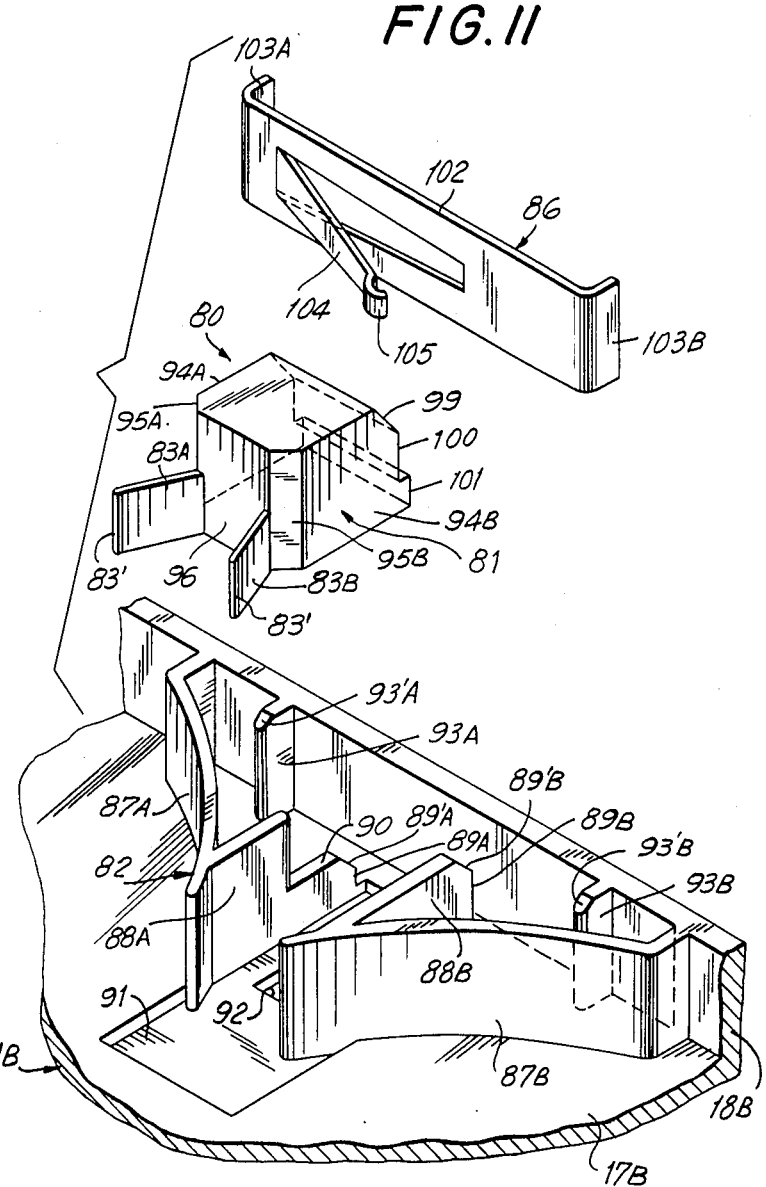
FIG. 11 is an exploded perspective view showing the elements included in the braking assembly according to the illustrated embodiment of the invention.
Figure 12:
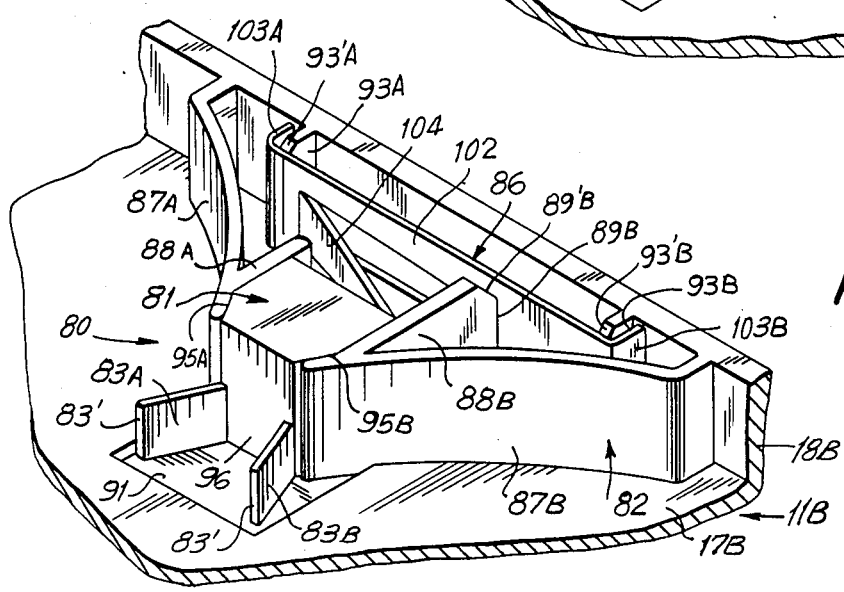
FIG. 12 is a perspective view illustrating the elements of FIG. 11 after the assembling thereof.

As shown particularly on FIGS. 9, 11 and 12, guide structure 82 is formed or molded in lower housing portion 11B so as to have forwardly converging, curving side portions 87A and 87B directed upwardly from bottom wall 17B and extending from laterally spaced locations on flange 18B at the back of the cassette housing. The curving side portions 87A and 87B of the guide structure are substantially concentric with reels 12A and 12B and are spaced apart, at their forward ends, by a distance smaller than the maximum width of brake body 81. Guide structure 82 further has parallel guide walls 88a and 88b spaced apart laterally so as to be adapted to slidably guide brake body 81 therebetween for to and fro movements in the directions of the arrow h and i on FIG. 9. The back ends 89A and 89B of parallel guide walls 88A and 88B are spaced from flange 18B at the back of housing portion 11B and have bevelled or inclined upper corners 89'A and 89'B, as particularly shown on FIG. 11. Further, guide wall 88A has a cutout 90 in its back end portion. Bottom wall 17B of housing portion 11B desirably has a recess 91 in its upper surface in the region of guide structure 82, and an opening 92 which is substantially laterally centered within recess 91. Spring locating ribs 93A and 93B are directed forwardly at laterally spaced locations on flange 18B at the back of the cassette housing so as to be located laterally outward in respect to guide walls 88A and 88B, respectively, as most clearly shown on FIG. 11. Such spring locating ribs 93A and 93B have oblique corners 93'A and 93'B at their upper ends and are dimensioned to extend forwardly from flange 18B a distance $l_1$ (FIG. 9) which is only slightly smaller than the distance $l_2$ from the back ends 89A and 89B of guide walls 88A and 88B to the back portion of flange 18B.

As shown particularly on FIGS. 9 and 11, brake body 81 has parallel side surfaces 94A and 94B spaced apart by a distance substantially equal to the distance between guide walls 88A and 88B so that the latter will slidably guide body 81 during its movements in the directions of the arrows h and i on FIG. 9. At its forward end, body 81 has oblique or angled corners 95A and 95B so that the front face 96 of body 81 has a width smaller than the distance between the forward ends of curving side portions 87A and 87B of the guide structure, as is particularly apparent on FIGS. 9 and 12. The resilient blade-like extensions 83A and 83B normally diverge from the opposite side margins of front face 96 so that, when brake body 81 is in its engaged position with oblique corners 95A and 95B bearing against the forward end portions of curving side portions 87A and 87B, as shown in full lines on FIG. 9, blade-like extensions 83A and 83B extend at angles into engagement with peripheral teeth 84A and 84B for preventing turning of reels 12A and 12B in the directions of the arrow f and g, respectively. However, due to the angled relationship of the resilient blade-like extensions 83A and 83B in respect to radii 12A and 12B at the points of engagement with the toothed peripheries 84A and 84B, reels 12A and 12B can be turned in directions opposed to the arrows f and g, respectively, for example, for tightening the tape in the run 13', and blade-like extensions 83A and 83B then skip over the peripheral teeth of the respective reels. When body 81 is moved in the direction of the arrow i to its disengaged position shown in dot-dash lines on FIG. 9, the normally diverging blade-like extensions 83A and 83B are flexed by engagement with the forward ends of curving side portions 87A and 87B into substantially parallel relation to each other so as to surely disengage the forward ends of blade-like extensions 83A and 83B from the toothed peripheries of reels 12A and 12B. As shown particularly on FIG. 10, by reason of the positioning of brake body 81 in recess 91 in the upper surface of bottom wall 17B, blade-like extensions 83A and 83B can extend above and below the respective toothed peripheries 84A and 84B of reels 12A and 12B for ensuring reliable braking of the reels when body 81 is in its engaged position. Further, as shown particularly on FIG. 10, brake body 81 has a downwardly opening socket 97 therein which registers with opening 92 in bottom wall 17B. When tape cassette 10 is operatively positioned in a corresponding VTR, a brake releasing member 98 of the latter is extended upwardly through opening 92 into socket 97 and is displaceable rearwardly to the position shown in dot-dash lines at 98' on FIG. 10 for moving brake body 81 to its disengaged or released position.

Figure 10:
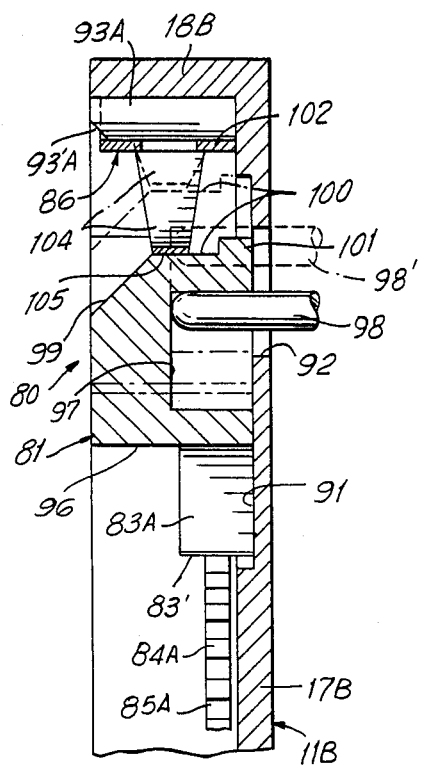
FIG. 10 is a sectional view taken along the line X—X on FIG. 9.

The back end of brake body 81 is shown to have a sloping or inclined upper surface portion 99, an intermediate surface portion 100 that is vertical or perpendicular to the bottom surface of body 81, and a lower projecting ledge 101 (FIGS. 10 and 11). The foregoing configuration at the back end of brake body 81 is provided for facilitating the installation of spring member 86 by which brake body 81 is normally urged to its engaged position.

As shown particularly on FIG. 11, spring member 86 is desirably in the form of a plate spring formed of resilient sheet metal and includes an elongated base portion 102 with rearwardly bent end portions 103A and 103B, and a laterally directed tongue 104 struck forwardly from base portion 102 so as to be normally at a substantial angle to the latter, with such tongue 104 having a rounded end portion 105 for bearing against brake body 81.

Figure 13:
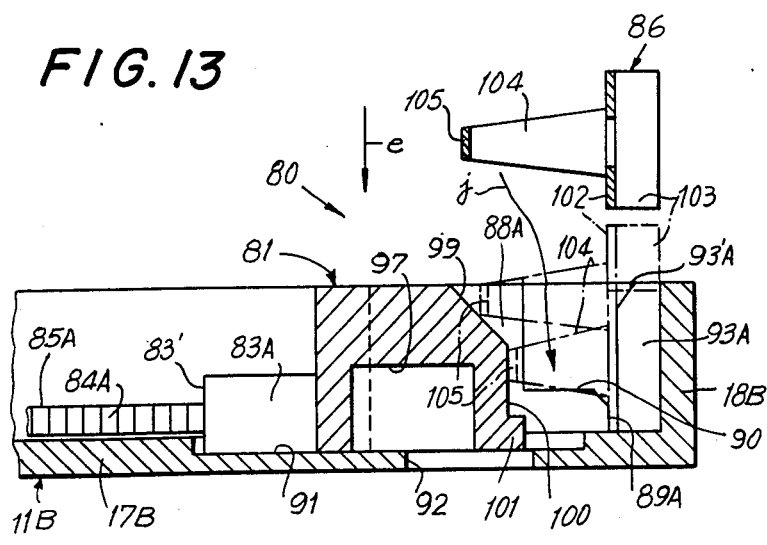
FIG. 13 is a sectional view similar to that of FIG. 10, but showing successive stages in the installation of a spring element included in the braking assembly.
Figure 7:
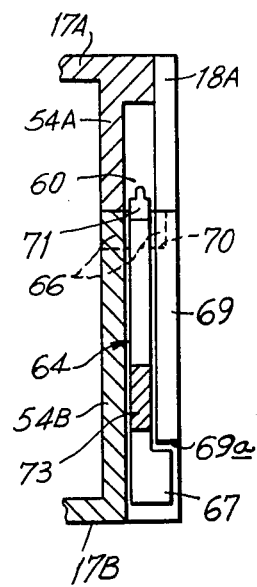
FIG. 7 is a detail sectional view taken along the line VII—VII on FIG. 3.
Figure 8:
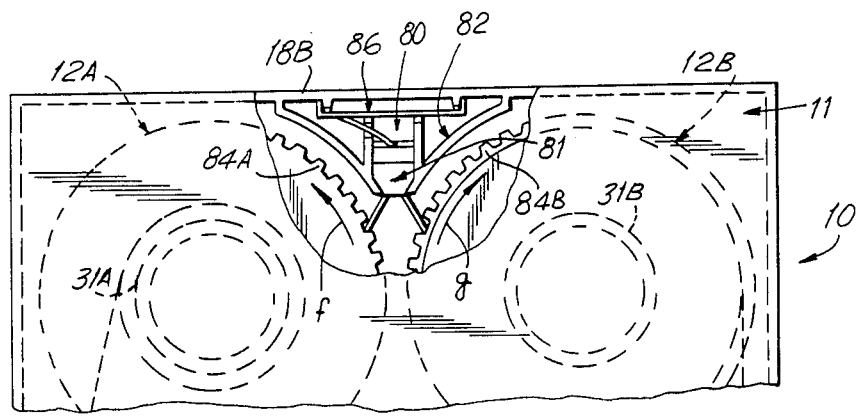
FIG. 8 is a fragmentary top plan view of the tape cassette with a portion of the top wall of the cassette housing being broken away to illustrate a braking assembly provided therein in accordance with the invention.

When assembling tape cassette 10, brake body 81 is inserted vertically downward between parallel guide walls 88A and 88B of guide structure 82 and is disposed in its foremost or engaged position shown on FIG. 13. Then plate spring member 86 is moved vertically downward in back of brake body 81 from the position shown in full lines on FIG. 13 through the successive positions indicated in dot-dash lines. In the course of such vertically downward movement of spring member 86, rearwardly bent end portions 103A and 103B engaged outwardly in respect to spring locating ribs 93A and 93B on flange 18B for laterally locating spring member 86, and base portion 102 of the spring member engages securely between the edges of locating ribs 93A and 93B and the back end edges 89A and 89B of guide walls 88A and 88B. Such engagement with base portion 102 causes slight flexing or bending of the latter so that base portion 102 is frictionally held in its desired position between locating ribs 93A and 93B and the back end edges 89A and 89B of guide walls 88A and 88B. The oblique or angled corners 93'A and 93'B at the upper ends of locating ribs 93A and 93B and the oblique or angled corners 89'A and 89'B at the upper ends of back end edges 89A and 89B facilitate the downward movement of base portion 102 of spring member 86 to its eventual or desired position between locating ribs 93A and 93B and the back end edges of guide walls 88A and 88B. Further, during downward movement of spring member 86 to its eventual operative position in housing portion 11B, rounded end 105 of tongue portion 104 comes into engagement with the sloping upper portion of the back surface of brake body 81 so that tongue portion 104 is flexed toward base portion 102, as indicated by the arrow j on FIG. 13. Eventually, that is, in the operative or installed position of spring member 86, tongue portion 104 thereof extends through cutout 90 in guide wall 88A and the rounded end portion 105 of tongue portion 104 bears against the vertical intermediate back end surface portion 100 of body 81. Thus, tongue portion 104 yieldably urges brake body 81 forwardly, that is, in the direction of the arrow h on FIG. 9, to the operative position of the brake body. Further, in the installed or operative position of spring member 86, its tongue portion 104 is disposed above ledge 104 at the bottom of the back end of brake body 81 and thereby resists upward removal of brake body 81 from between guide walls 88A and 88B.

As shown in broken lines on FIG. 2, leaf springs 106A and 106B may be suitably secured to the underside of top wall 17A for holding reels 12A and 12B, respectively, against bottom wall 17B when cassette 10 is not in use.

It will be apparent from the foregoing that, in tape cassette 10 embodying this invention, the various component parts to be installed in lower housing portion 11B can all be placed therein in a vertically downward direction, whereupon, the upper housing portion 11A with lid assembly 14 and coil spring 57 mounted thereon can be similarly vertically brought together with lower housing portion 11B. Such vertical movements of the several components and housing portions when assembling together the tape cassette 10 are readily accomplished by automated equipment for facilitating, and reducing the cost of assembling operations. Of course, after housing portions 11A and 11B have been vertically brought together, as described above, suitable screws indicated in broken lines at 107 on FIG. 2 may be inserted for securing together the housing portions.

Having described a preferred embodiment of this invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A tape cassette comprising upper and lower housing portions assembled together to define a housing of substantially rectangular configuration having end walls and an opening along a side of said housing between said end walls, said upper and lower housing portions have substantially rectangular top and bottom walls, respectively, and flanges along the margins of said top and bottom walls engaging each other at a plane of separation substantially parallel with said top and bottom walls when said housing portions are brought together in a direction normal to said plane for defining a peripheral structure of the housing which includes said end walls, reels rotatably contained in said housing and having tape wound thereon, guide means in said housing leading said tape between said reels in a run extending across said opening, lid means having ears at its opposite ends with pivot pins extending from said ears to define a pivot axis, said flange of at least said upper housing portion having cutouts in the edge thereof to receive and locate said pivot pins in respect to said housing and thereby mounting said lid means for movement about said pivot axis between an open position exposing said run of the tape for withdrawal from said housing and a closed position in which said lid means covers said tape run, coil spring means including a coil portion disposed on one of said pivot pins and angularly displaced leg portions extending from said coil portion, substantially diametrically opposed first and second spring anchor means located on the one of said ears from which said one pivot pin extends and being tentatively engageable with said leg portions of the coil spring means for initial positioning of the latter relative to said lid means, said coil portion urging said leg portions angularly apart in one direction and against said first and second anchor means, and third anchor means disposed on said flange of the upper housing portion and having an oblique surface and a normal anchor surface, one of said leg portions being movable against the force of said coil portion away from the respective one of said first and second anchor means and being deflected by said oblique surface onto said normal surface of said third anchor means when assembling said lid means in respect to said one portion of the housing, whereupon said spring means urges said lid means to said closed position relative to said housing.

2. A tape cassette according to claim 1; further comprising latch means mounted on said lower housing portion adjacent said one end wall of the housing and having an engaged condition for locking said lid means in said closed condition and a released condition for permitting movement of said lid means to said open position; and in which said one leg portion of the coil spring means engages said latch means upon the bringing together of said housing portions in said direction normal to the plane of separation for thereafter urging said latch means to said engaged condition thereof.

3. A tape cassette according to claim 2; in which said peripheral structure of the housing defines sockets opening in an edge of said flange of the lower housing portion; and in which said latch means includes a latch element having a pivot pin at its upper end portion received in said sockets from above, an abutment on said latch element spaced from said pivot pin and engageable by said one leg portion of the spring means, a keeper element located on said one ear and against which said latch element is urged by engagement of said one leg portion of the spring means with said abutment on said latch element, and a release portion at the lower end of said latch element and by which the latter can be actuated to its released condition.

4. A tape cassette according to claim 3; in which said lid means includes an outer lid member having said ears at the opposite ends thereof and extending in front of said tape run in said closed position of the lid means, and an inner lid member pivoted in respect to said outer lid member to be closely adjacent the latter in back of said tape run in said closed position of the lid means and to provide a substantial gap between said outer and inner lid members in said open position of the lid means for accommodating said tape run in said gap when moving said lid means from said open position toward said closed position.

5. A tape cassette according to claim 1; further comprising braking means installed in said housing in said direction normal to the plane of separation and being movable parallel to said plane between engaged and disengaged positions, one of said housing portions having an opening through which said braking means is accessible from the exterior of said housing for movement to said disengaged position, and a plate spring member also installed in said housing in said direction normal to said plane of separation for urging said braking means to said engaged position.

6. A tape cassette according to claim 5; in which said reels are disposed side-by-side in said housing and have flanges with toothed peripheries; and said braking means includes a brake body, brake guide means in said housing at a location between said reels adjacent the side of the housing remote from said side along which said opening extends, said brake body being slidable along said brake guide means between said engaged and disengaged positions, and a pair of diverging, blade-like extensions projecting from said brake body toward said reels and being engageable with said toothed peripheries of the respective flanges in said engaged position for preventing rotation of said reels in the directions causing slack to appear in said tape run.

7. A tape cassette according to claim 6; in which said brake body has an end surface with a sloping portion engaged by said plate spring member during the installation of the latter into said housing.

8. A tape cassette according to claim 1; in which first and second spring anchor means have notches receiving said leg portions and torsionally stressing said coil portion so that said leg portions are urged to remain in said notches for avoiding inadvertent removal of said coil portion from said one pivot pin pending the mounting of said lid means on said upper housing portion.

9. A tape cassette comprising upper and lower housing portions which are brought together in a direction substantially normal to a plane of separation therebetween for defining a substantially rectangular housing, a pair of reels rotatably located in side-by-side relation in said housing and having tape wound thereon, said reels having flanges with toothed peripheries, means guiding the tape between said reels in a run extending along a side of said housing, brake guide means in said housing at a location between said reels adjacent the side of the housing remote from said side along which said tape run extends, a brake body installed in said brake guide means in said direction normal to the plane of separation and being slidable along said brake guide means between engaged and disengaged positions, a pair of diverging, blade-like extensions projecting from said brake body toward said reels and being engageable with said toothed peripheries of the respective flanges in said engaged position for preventing rotation of said reels in the directions causing slack to appear in said tape run, one of said housing portions having an opening through which said brake body is accessible from the exterior of said housing for movement to said disengaged position, and a plate spring member also installed in said housing in said direction normal to said plane of separation for urging said brake body to said engaged position, said brake body having an end surface with a sloping portion engaged by said plate spring member during the installation of the latter into said housing.

* * * * *